(12) United States Patent
Loomis

(10) Patent No.: US 10,127,571 B2
(45) Date of Patent: Nov. 13, 2018

(54) SYSTEMS AND METHODS FOR SUGGESTING FINANCIAL ACCOUNT CARDS STORED ON A WIRELESS DEVICE

(71) Applicant: Capital One Financial Corporation, McLean, VA (US)

(72) Inventor: Daniel Loomis, San Francisco, CA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/869,815

(22) Filed: Jan. 12, 2018

(65) Prior Publication Data

US 2018/0137531 A1    May 17, 2018

Related U.S. Application Data

(63) Continuation of application No. 14/467,482, filed on Aug. 25, 2014.

(51) Int. Cl.
*G06Q 30/02* (2012.01)
*G06Q 20/22* (2012.01)
*G06Q 20/32* (2012.01)

(52) U.S. Cl.
CPC ....... *G06Q 30/0226* (2013.01); *G06Q 20/227* (2013.01); *G06Q 20/322* (2013.01); *G06Q 30/0233* (2013.01)

(58) Field of Classification Search
CPC ..................................................... G06Q 30/02
See application file for complete search history.

(56) References Cited

U.S. PATENT DOCUMENTS

| | | | |
|---|---|---|---|
| 7,827,057 B1 | 11/2010 | Walker et al. | |
| 2006/0178986 A1* | 8/2006 | Giordano | G06Q 20/04 705/40 |
| 2007/0061198 A1 | 3/2007 | Ramer et al. | |
| 2011/0218884 A1 | 9/2011 | Kothari et al. | |
| 2012/0290366 A1* | 11/2012 | Giles | G06Q 30/02 705/14.1 |
| 2012/0310760 A1* | 12/2012 | Phillips | G06Q 40/02 705/26.1 |
| 2013/0030925 A1* | 1/2013 | Calman | G06Q 30/02 705/14.66 |

* cited by examiner

*Primary Examiner* — Vincent M Cao
(74) *Attorney, Agent, or Firm* — Finnegan, Henderson, Farabow, Garrett & Dunner, LLP

(57) ABSTRACT

A wireless device is enabled to process a transaction. In one implementation, the wireless device receives card data for a plurality of financial account cards and stores the card data in memory associated with the wireless device. The wireless device determines merchant information for the transaction and determines rewards benefit information for at least some of the plurality of financial account cards. The wireless device provides a suggestion of at least one of the plurality of financial account cards to use in the transaction based on the determined rewards benefit information.

17 Claims, 7 Drawing Sheets

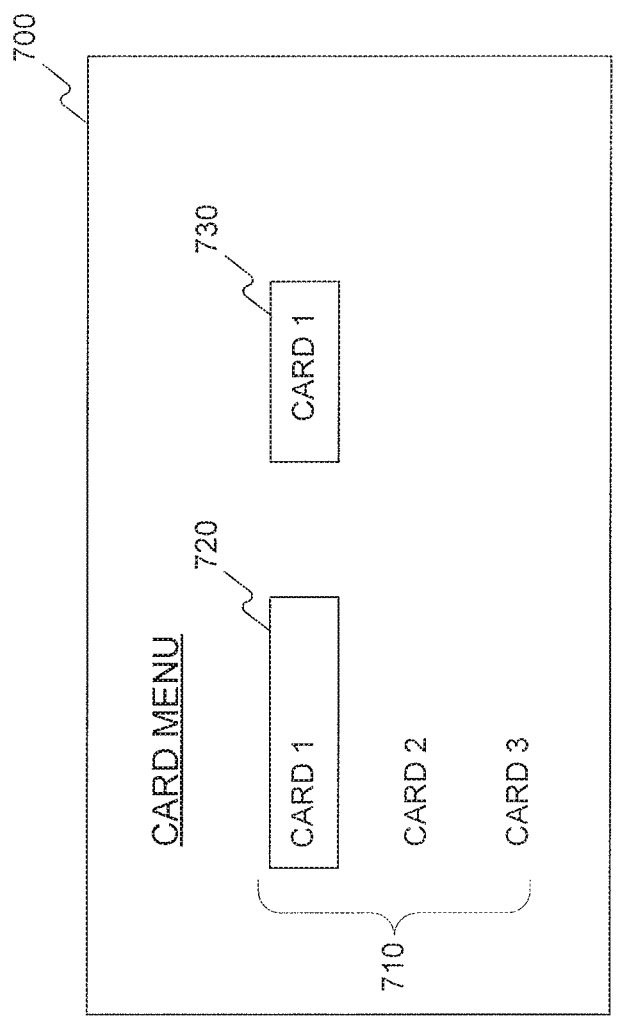

SYSTEMS AND METHODS FOR SUGGESTING FINANCIAL ACCOUNT CARDS STORED ON A WIRELESS DEVICE

CROSS REFERENCE TO RELATED APPLICATION

This application is a continuation of and claims the benefit of U.S. patent application Ser. No. 14/467,482, filed Aug. 25, 2014, which is hereby incorporated by reference in its entirety.

BACKGROUND

In a conventional credit card transaction, a credit card holder presents a financial account card, such as a credit card or debit card, to a merchant. The merchant typically swipes a magnetic stripe on the card through a card reader that is built into or attached to a point-of-sale (POS) terminal. The magnetic stripe generally includes account information, such as an account number of the card, an identity of the card holder, and an expiration date of the card. Once the merchant has swiped the card through the card reader, the account information is transmitted to the POS terminal. Alternatively, instead of the merchant swiping the card, the credit card holder may personally swipe the card at a self-service check out station or may insert the card into a card reader built into, for example, a gasoline pump. Once the card reader has read the card data, the card data is transmitted over a secure network, authenticated, and ultimately used to authorize a transaction. In any of these kinds of transactions, however, the credit card must be physically read by a magnetic stripe reader in order to obtain the card data that is stored on the magnetic stripe.

As the prevalence of wireless devices continues to increase, new methods of storing and transmitting data have begun to emerge. One such example is to use RFID (radio frequency identification) tags for transmitting information. RFID tags are microchips, some versions of which may store and encrypt data. Some wireless devices may also transmit information wirelessly using other technology such as Bluetooth, Wi-Fi, near field communication (NFC), and cellular technologies such as CDMA, TDMA, LTE, GSM, for example. In some cases a wireless device, such as cellular phone, tablet, or laptop, for example, can store and securely transmit card data using encryption techniques to a POS terminal. Accordingly, a wireless device storing credit card data may be used as a payment device without requiring the actual credit card to be swiped by a magnetic card reader. As most wireless devices have the capacity to store card data for more than one financial account card, they can act as an "electronic wallet" allowing a consumer to choose card data from one or more available financial cards to use in transaction, similar to the consumer choosing a traditional, plastic credit card from her wallet.

The use of wireless devices as electronic wallets provides the opportunity to store data related to financial account cards in addition to the card data for the financial account card data. One example of this additional data is rewards program data. Rewards programs provide an incentive to use a financial account card. A rewards program typically awards points when the financial account card is used that the financial account card holder can later redeem. For example, a classic rewards program is a frequent flyer miles program; a consumer might earn a mile for every dollar spent and the consumer can redeem earned miles for a free flight. Some consumers have multiple financial account cards each with their own rewards program. For example, a first financial account card might have a first rewards program that offers points for gasoline purchases, a second financial account card might have a second rewards program that offers points for grocery purchases, and a third financial account card might have a third rewards program that offers points on all purchases. Some rewards programs can offer a different reward based on the type of purchase. For example, a rewards program might offer one point per dollar spent for all purchases, two points per dollar spent for grocery purchases, and three points per dollar spent for gasoline purchases.

SUMMARY

According to some disclosed embodiments, a method enables a wireless device to use card data during a transaction. One or more processors receives card data for a plurality of financial account cards and stores the card data in a memory associated with the wireless device. The one or more processors determine merchant information for the transaction and rewards benefit information for at least some of the plurality of financial account cards. The one or more processors provide a suggestion of at least one of the plurality of financial account cards to use in the transaction based at least in part on the determined rewards benefit information According to some disclosed embodiments, a wireless device uses card data during a transaction. The wireless device includes one or more processors and a memory having instructions that when executed by the one or more processors cause the one or more processors to receive card data for a plurality of financial account cards and store the card data. The one or more processors determine merchant information for the transaction and rewards benefit information for at least some of the plurality of financial account cards. The one or more processors provide a suggestion of at least one of the plurality of financial account cards to use in the transaction based at least in part on the determined rewards benefit information.

According to some disclosed embodiments, a non-transitory computer readable medium stores instructions that cause one or more processors to receive card data for a plurality of financial account cards and store the card data in a memory associated with a wireless device. The one or more processors determine merchant information for the transaction and rewards benefit information for at least some of the plurality of financial account cards. The one or more processors provide a suggestion of at least one of the plurality of financial account cards to use in the transaction based at least in part on the determined rewards benefit information.

It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments consistent with the disclosure. In the drawings:

FIG. 7 is an exemplary menu of stored cards that is shown on a display of a wireless device.

DESCRIPTION OF EMBODIMENTS

Figure 1:
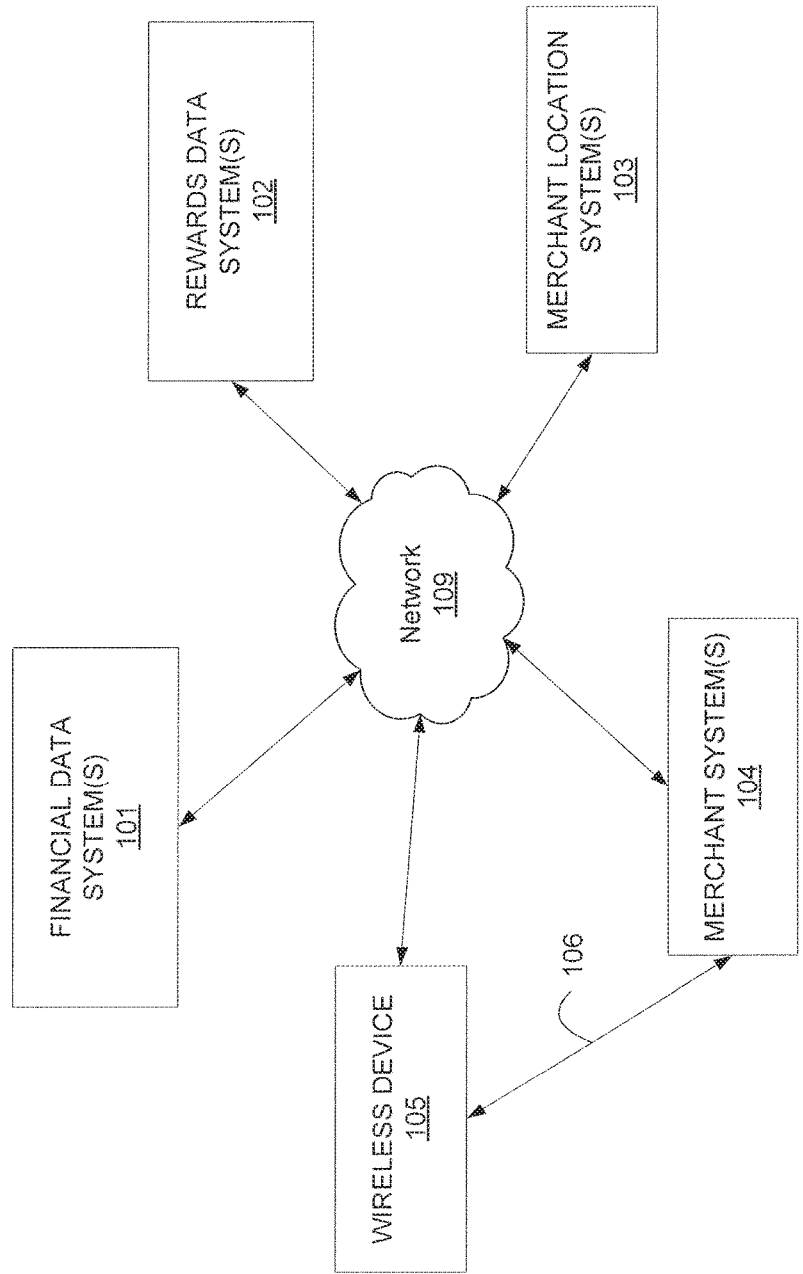
FIG. 1 shows exemplary computing systems connected via a network that can be configured to perform the operations of disclosed embodiments.

The use of wireless devices, such as cellular phones, tablets, and laptops, as electronic wallets provides a more interactive transaction experience than what is capable using a traditional, plastic, financial account card with a magnetic stripe. As wireless devices include processors, memory, and components for wireless communication with other computer systems, they can be configured to communicate with one or more merchant systems during a transaction. For example, during a transaction, a wireless device can receive information about the transaction, such as line-item transaction data describing the goods or services that are part of the transaction, or information about the merchant itself, such as the merchant's Merchant Category Code (MCC), name, address, or other descriptive information.

The ability for the wireless device and the merchant computing system, such as POS terminal, to communicate provides the opportunity for consumers to maximize their rewards programs for each transaction, because the information the wireless device receives from the POS terminal can be used to make an informed decision regarding which financial account card may be best suited for the transaction. As consumers might have multiple financial account cards, each providing different rewards based on the type of purchase, it can be difficult for consumer to select the financial account card that will provide them the best benefit for each transaction. But, when using a wireless device for transactions, the wireless device can perform processing that can suggest or automatically select the financial account card with the best rewards benefit for a particular transaction. Using a wireless device as electronic device also provides opportunities for dynamic rewards redemption that can be applied to a current transaction. For example, consumers can have the opportunity to redeem points to pay for goods or services at the time of transaction at a merchant's POS, as opposed to waiting for a coupon that might be delivered through the mail or email.

Accordingly, the embodiments disclosed herein describe a system where rewards benefit information and information about the transaction are taken into consideration by a wireless device that is being used an electronic wallet for the transaction. For example, when a consumer has stored card data for multiple financial account cards, the system might suggest a financial account card that will provide the consumer with the greatest opportunity to acquire rewards points. The system might also suggest a financial account card for use in a transaction that will provide the greatest reward benefit. The information about the transaction might be received from a merchant POS terminal or other merchant computing system, or it might be determined by the wireless device independent of the merchant POS terminal or other merchant computing system based on the current location of the wireless device.

In some embodiments, the system will provide the opportunity for the consumer to use more than one financial account card for a transaction to maximize the opportunity to acquire reward or redeem points. For example, a consumer may have a first financial account card that provides rewards for groceries and second financial account card that provides rewards for electronics purchases. The consumer may purchase both groceries and electronics from a single merchant in a single transaction. In such event, the system might suggest that the consumer purchase the groceries with card A and the electronics with card B. The line-item information about the transaction might be received from a merchant POS terminal or other merchant computing system according to some embodiments.

Reference will now be made to exemplary embodiments, examples of which are illustrated in the accompanying drawings. Wherever possible, the same reference numbers will be used throughout the drawings to refer to the same or like parts.

FIG. 1 shows a block diagram of an exemplary networked system 100 where a wireless device can communicate with one or more remote computing systems to perform operations consistent with the disclosed embodiments. In one embodiment, system 100 can include wireless device 105, one or more financial data system(s) 101, one or more rewards data system(s) 102, one or more merchant system(s) 103, one or more merchant location system(s) 104, and a network 109. The components and arrangement of the components included in system 100 can vary. Thus, system 100 can include fewer or additional components that perform or assist in the performance of one or more processes consistent with the disclosed embodiments.

In some embodiments, components of system 100 can include one or more computing devices (e.g., computer(s), server(s), etc.), memory storing data and/or software instructions (e.g., database(s), memory devices, etc.), and other known computing components. The one or more computing devices can be configured to execute software instructions stored on one or more memory devices to perform one or more operations consistent with the disclosed embodiments. Components of system 100 can be configured to communicate with one or more other components of system 100 via network 109, or directly with each other via direct communication means. For example, wireless device 105 can communicate with merchant system(s) 103 via direct communication link 106 which can include, RFID, WiFi, Bluetooth, LiFi, communication or any other wireless communication protocol known in the art.

Financial data system(s) 101 can be a system or systems associated with financial service providers. Financial services providers can be a business entity that provides financial account card to consumers such as a bank, credit card issuer, or other entity that generates, provides, manages, and/or maintains financial service accounts for one or more users. Financial data system(s) 101 can generate, maintain, store, provide, and/or process financial data associated with one or more financial account cards. Financial data can include information about financial accounts including, but not limited to, issuing financial institution, card holder name, card holder address, account balance, available credit, existing fees, card expiration dates, and account transaction data (e.g., transaction dates, transaction amounts, transaction types, location of transaction, etc.).

In some embodiments, financial data system(s) 101 can provide account information to requesting computing systems, such as wireless device 105, for example. Financial data system(s) 101 can expose, in some embodiments, an application programming interface (API) that provides one or more methods for obtaining account information to requesting computing systems. For example, a requesting computing system (such as wireless device 105) can provide financial data system(s) 101 with an financial card account number via the API, and financial data system(s) 101 can provide the requesting computing system with the name, address, expiration date, issuing bank, or other information associated with the financial card account number. The account information can be provided as a binary data stream, serialized data object, XML object, or in some other data form known to those with skill in the art.

Reward(s) data system 102 can be a computing system associated with a rewards program provider. A rewards program provider can be an entity that offers rewards programs associated with financial account cards. Reward(s) data system 102 can maintain information about rewards acquisition and rewards redemption for the rewards program accounts of consumers. In some embodiments, rewards) data system 102 can expose an API that provides one or more methods for providing rewards account information to requesting computing system. For example, a requesting computing system (such as wireless device 105) can provide reward(s) data system 102 with a rewards account number, or the financial card account number associated with the rewards account number, via the API and reward(s) data system 102 can provide the requesting computer system information regarding the rewards account such as rewards account balance, eligibility for rewards acquisition, and rewards redemption information.

In some embodiments, merchant location system(s) 103 can be a computing system that provides merchant information based on a given location. In some embodiments, merchant location system(s) 103 can be capable of mapping geolocation data (e.g., GPS data) to merchants or Merchant Category Codes (MCCs). For example, merchant location system 103 can expose an API that provides one or more methods for providing merchant information to requesting computing systems. For example, a requesting computing system (such as wireless device 105) may send a request, via the API, to merchant location system(s) 103 including its current location and merchant location system(s) 103 may provide the MCC for the closest merchant, or the name, address, or other information concerning the closest merchant.

Merchant system(s) 104 can be one or more computing devices configured to perform one or more operations consistent with disclosed embodiments. Merchant system(s) 104 can be a computing device that is controlled and operated by a merchant that provides products (e.g., goods and/or services), such as a restaurant (e.g., Outback Steakhouse®, Burger King®, etc.), retailer (e.g., Amazon.com®, Target®, etc.), grocery store, service provider (e.g., utility company, insurance company, financial service provider, automobile repair services, etc.), non-profit organization (e.g., ACLU™, AARP®, etc.) or any other type of entity that provides goods, services, and/or information that consumers (i.e., end-users or other business entities) can purchase, consume, use, etc. For ease of discussion, the present disclosure may describe exemplary embodiments in the context of purchase transactions involving goods from retail merchants, but merchant system(s) 104 is not limited to systems associated with retail merchants that conduct business in any particular industry or field. According to some embodiments, merchant system(s) 104 can be a mobile device (e.g., tablet, smart phone, etc.), a desktop computer, a laptop, a server or any other type of computing device. Merchant system(s) 104 can also include a television, e-reader, or any other type of device capable of communicating with other components of system 100.

Merchant system(s) 104 can include a POS terminal, which can be a dedicated POS terminal (e.g., POS Terminal 430), or a software application that can configure a general purpose computing device to accept financial account card payments. For example, the payment application can configure the general purpose computing device to interface with an input device connected to the general purpose computing system. The input device can include a terminal or port that accepts data financial account card data from wireless device 105.

According to some embodiments, merchant system(s) 104 may be configured with a transceiver to transmit transaction data pertaining to the transaction. The transaction data can be transmitted to wireless device 105, or any other computing device configured to receive transaction data. For example, the POS terminal, or some other part of merchant system(s) 104 may transmit the MCC corresponding to the merchant to the wireless device. In some embodiments, merchant system(s) 104 can transmit line-item data from the transaction to mobile wireless device 105. For example, merchant system(s) 104 may transmit stock keeping units (SKUs) of the items that are being purchased in the transaction and/or merchant system(s) 104 may transmit an MCC corresponding to the items that are being purchased in the transaction. In some embodiments, merchant system(s) 104 may transmit multiple MCCs to wireless device 105 for a transaction if the goods or services being purchased are typically associated with different categories of merchants. For example, a consumer may purchase both fuel and food from a convenience store. The fuel portion of the transaction may be $30 and the food portion of the transaction may be $15. During the transaction, the merchant system 104 for the convenience store may transmit an MCC associated with fuel dealers (e.g., 5542) for the fuel portion of the transaction, $30, and the merchant system 104 for the convenience store may transmit an MCC associated with grocery stores (e.g., 5411) for the food portion of the transaction, $15. In embodiments where merchant system(s) 104 sends MCCs representative of the items purchased (such as the convenience store example above) the MCCs associated with the goods or services purchased need not be the same as the MCC of the merchant controlling and operating merchant system(s) 104, and the MCCs associated with the goods or services may be used by receivers of the transaction data (e.g., wireless device 105) to categorize the types of goods or services purchased in a transaction.

System 100 can also include network 109 in some embodiments which can be any type of network configured to provide communications between components of system 100. For example, network 109 can be any type of network (including infrastructure) that provides communications, exchanges information, and/or facilitates the exchange of information, such as the Internet, a Local Area Network, or other suitable connection(s) that enables the sending and receiving of information between the components of system 100. In other embodiments, one or more components of system 100 can communicate directly through dedicated communication link(s), such as link 106.

Figure 2:
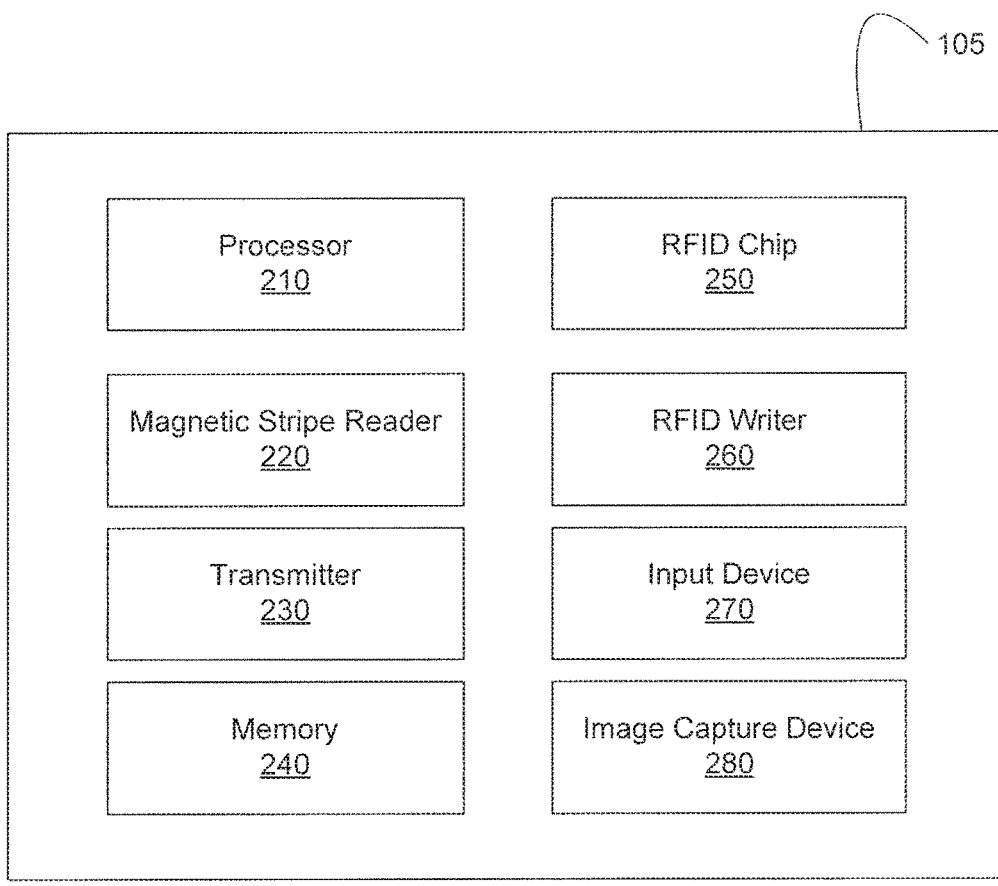
FIG. 2 is an exemplary block diagram of the components of a wireless device.

FIG. 2 shows a block diagram of the components of wireless device 105 according to one embodiment. For example, wireless device 105 may include a processor 210, a magnetic stripe reader 220, a transmitter 230, a memory 240, an RFID chip 250, an RFID writer 260, an input device 270, and an image capture device 280. Other components that may be included in wireless device 105 include a battery (not shown) for supplying power to transmitter 230 and RFID chip 250. Furthermore, wireless device 105 may include a sensor (not shown) for detecting the presence of a card. Still further, wireless device 105 may include a smart card reader (not shown) in addition to, or in place of, magnetic stripe reader 220. Wireless device 105 may also include a display, and in some cases a touch sensitive display.

In some embodiments, processor 210 may instruct magnetic stripe reader 220 to read card data from a card as it is inserted into wireless device 105. Alternatively, a smart card reader included in wireless device 105 may read data from the card. Further, card data that has been read from a card may be stored in memory 240 or may be written by RFID writer 260 to RFID chip 250. Transmitter 230 may be used in addition to RFID chip 250 to transmit card data and/or other data from wireless device 105. For example, transmitter 230 may be used to boost the signal strength of radio frequency signals sent from wireless device 105.

In some embodiments, card data from a card can be input to wireless device 105 using input device 270. For example, input device 270 can include a keypad or touchscreen configured to receive input from a user, and processor 210 may interpret data received by the input device 270 as card data which is stored in memory 240 or the RFID chip. Wireless device may also capture card data from a card using image capture device 280 which can include a camera, optical sensor, infrared sensor or other sensor configured to capture an image. Once an image of a card is captured by image capture device 280, processor 210 can store the card data in memory or write it to RFID Chip 250 using RFID writer 260.

In some embodiments, wireless device 105 can be used to purchase goods or services in a wireless transaction. During a transaction, a user may make a secured payment with wireless device 105. In such a transaction, card data stored on wireless device 105 may be transmitted by, for example, RFID chip 250 to a nearby RFID reader associated with a merchant, such as first merchant system 104 or second merchant system 106. As wireless device 105 may be capable of storing card data for one or more financial account cards, wireless device 105 can also act as an electronic wallet.

A user of wireless device 105 may also store data for multiple cards by providing a first card to wireless device 105 so that the device may store the card data from the first card in memory 240. The user may then provide a second card to wireless device 105 which is also stored in memory 240. After a user has stored card data for more than one card in wireless device 105, the user may select a card from a menu screen shown on a display of wireless device 105, such as the menu screen shown in FIG. 7 and described in further detail below. In some embodiments, wireless device 105 may suggest a stored card or default the selection of the card on displayed menu based on user preferences, data describing the transaction for which the card will be used, or based on an offer presented by wireless device 105 consistent with embodiment disclosed herein.

Wireless device 105 may also include security features that authorize a transaction. For example, a security validation may be required for transactions to prevent unauthorized use of card data stored in memory 240. Further, card data may be encrypted using encryption techniques so that transmitted card data cannot be intercepted in an accessible form.

Figure 3:
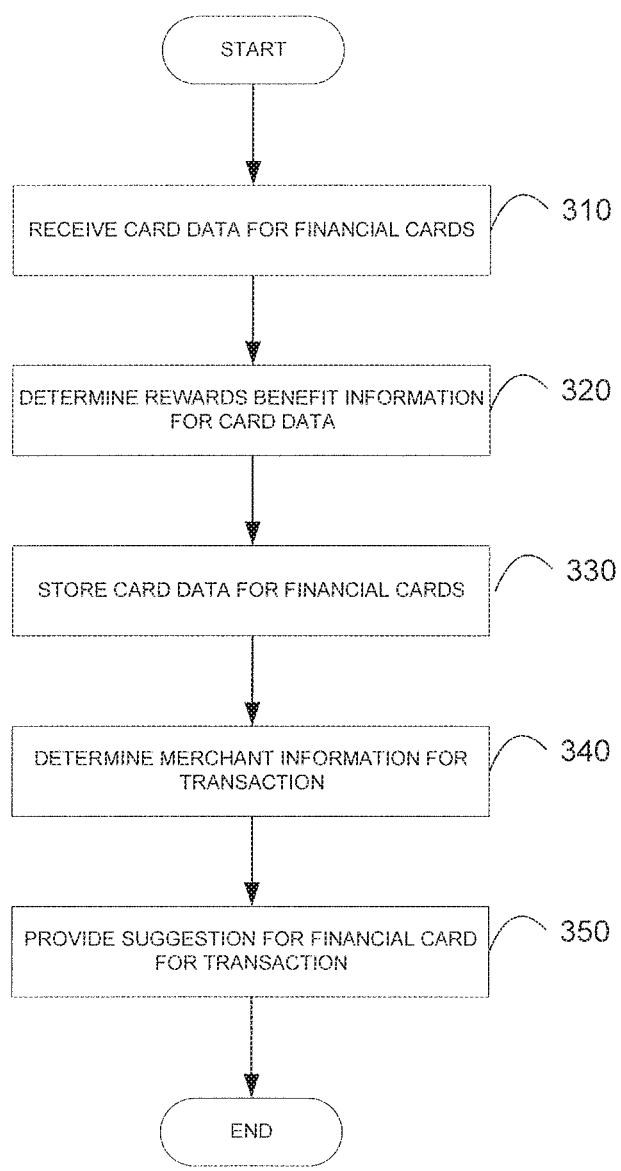
FIG. 3 is an exemplary flow diagram of a process for providing a suggestion of card data to use in a transaction.

FIG. 3 shows an exemplary flow diagram 300 of a process for suggesting a financial account card for use in a transaction consistent with present embodiments. A wireless device may receive card data for one or more financial account cards (Step 310). In some embodiments, the wireless device receives the card data via a card reader that is part of the wireless devices or attached as a peripheral to the wireless device consistent with present embodiments. According to some embodiments, the wireless device receives the card data via one of its associated input/output devices such as a touchscreen, keypad, or camera. For example, a user of the wireless device may manually enter an account number associated with the financial card, or the user may take a picture of the card with the wireless device's camera, and OCR capable software installed on the wireless device may extract the card data.

Figure 4:
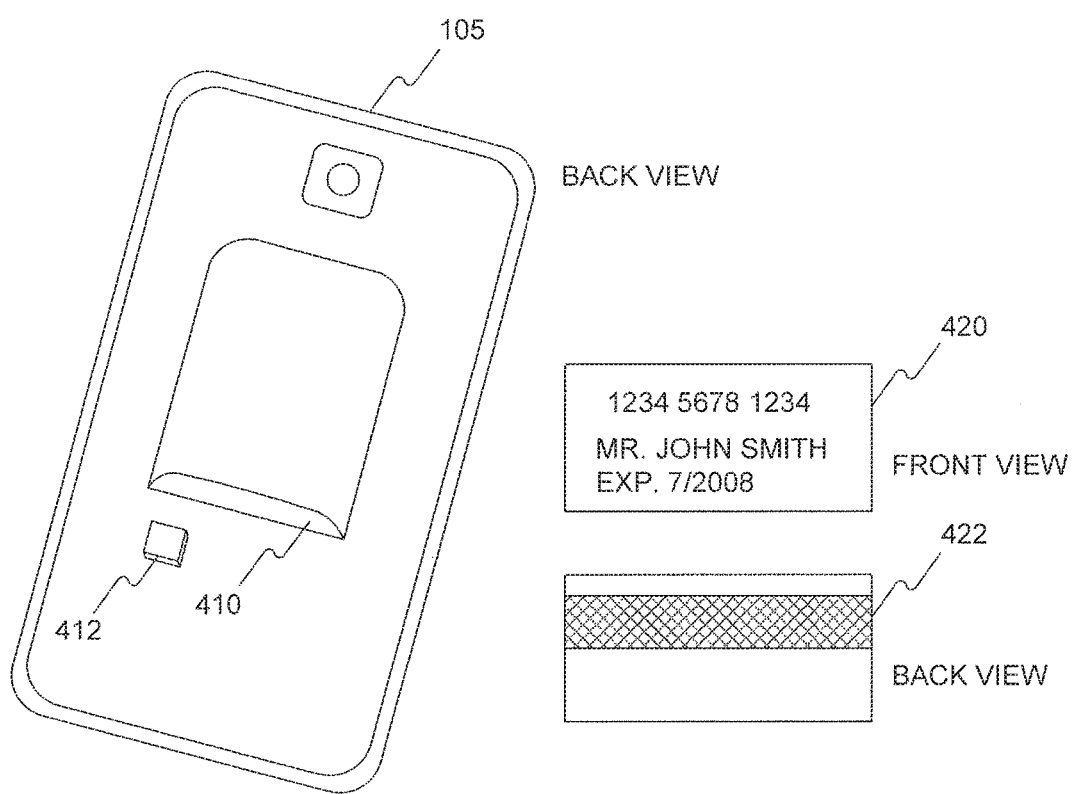
FIG. 4 shows an exemplary wireless device including a card slot for inserting a financial account card.

In some embodiments, wireless device 105 may receive the card data through a dedicated card reader attached to, or part of, wireless device 105 as shown in FIG. 4. FIG. 4 shows a back view of an embodiment of wireless device 105 including a card slot 410 for inserting a card 420 and an eject button 412. According to the example shown in FIG. 4, wireless device 105 is preferably a mobile phone. However, wireless device 105 may be a PDA, or other handheld device, such as a Blackberry. Although wireless device 105 shows card slot 410 on the back of the device, card slot 410 may be incorporated into any appropriate location of wireless device 105. Further, card slot 410 may be oriented in any appropriate direction for receiving card 420. In exemplary embodiments, card slot 410 may include a reader (not shown) for reading card data on card 420. Further, in some embodiments, wireless device 105 may not include card slot 410 and instead can receive card data via input devices such as a touchscreen, keypad, or camera. For example, a user of wireless device 105 may manually enter an account number associated with the financial card, or the user may take a picture of the card with wireless device's 105 camera, and OCR capable software installed on wireless device 105 may extract the card data.

Card 420 may be a financial account card, such as a credit card, a debit card, a smart card, an ATM card, or any other card associated with a financial account and that may be used to make purchase transactions. Card 420 includes, for example, account information such as information identifying the card holder, an account number, and expiration date. Further, as shown in FIG. 4, according to the back view of card 420, card 420 includes magnetic stripe 422. In the case of a smart card, card 420 will include a smart card chip (not shown), which may be read by a smart card reader included in wireless device 105 in addition to, or instead of, a reader to read magnetic stripe 422.

According to some embodiments, once card 420 is inserted into wireless device 105, a mechanism (not shown) may hold card 420 in place such that it does not fall out of wireless device 105. Furthermore, wireless device 105 may include eject button 408 for removing card 420 from wireless device 105. For example, when a user desires to remove card 420 from wireless device 105, the user may press eject button 408, which ejects card 420 through card slot 410.

Figure 5:
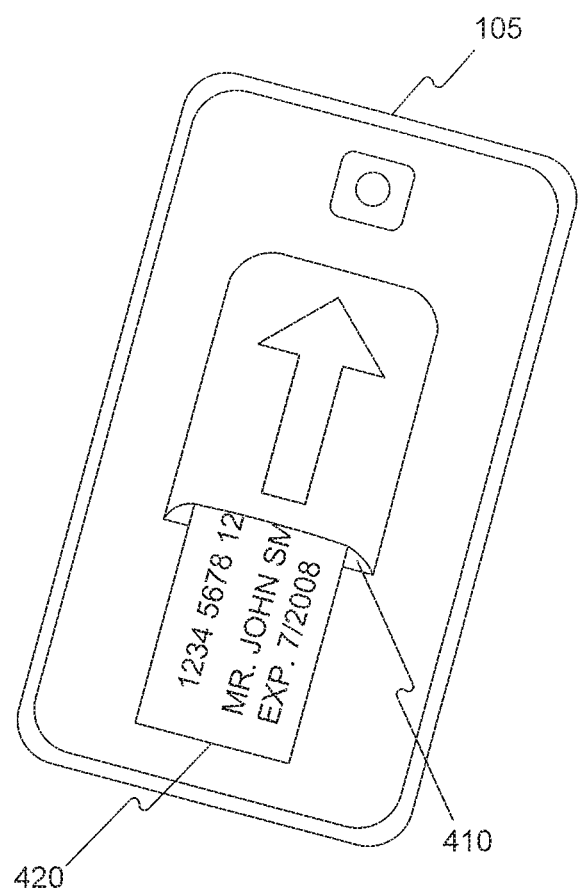
FIG. 5 shows an example of a financial account card being inserted into the card slot of the wireless device shown in FIG. 4.

FIG. 5 shows card 420 being inserted into card slot 410 of wireless device 105. When card 420 is inserted into card slot 410 of wireless device 105, a magnetic stripe reader (not shown) may read card data stored on magnetic stripe 422. Alternatively, card 420 may include a smart card chip, which may be reader by a smart card reader (not shown) included in wireless device 105. Card data may be stored in a memory of wireless device 105 (e.g., memory 240) or may be used to program an RFID chip included in wireless device 105 (e.g. RFID Chip 250).

In some embodiments, the wireless device may communicate with one or more remote computer systems to obtain additional card data that is not stored directly on a financial account card. For example, the wireless device may communicate with one or more remote computer systems to obtain the identity of the financial institution that issued the financial account card, branding associated with the card, the name and address of the account holder of financial account card, etc. Some financial account cards may be associated with a rewards program that provides the owner of the financial account card an opportunity to acquire points in exchange for redeemable benefits based on the owner's use of the financial account card. The redeemable benefits could be, for example, cash, rewards points, lower interest rates, frequent flyer miles and the like. The acquisition of rewards may be associated with a particular type of purchase made with the financial account card, or they may be associated with any purchase made using the financial account card. For example, one reward program might award points when used for gasoline purchases, another rewards program might award points when used at grocery stores, and another rewards program might award points for any purchase. Some rewards programs associated with financial cards might over several different types of rewards based on transaction type. For example, a rewards program might offer one point for every dollar spent for all transactions, two points for every dollar spent for grocery purchases, and three points of every dollar spent for gasoline purchases.

Returning to FIG. 3, according to some embodiments, when the wireless device receives card data, it may determine rewards benefit information for the received card data. (Step 320). For example, the wireless device may request from one or more remote computer systems, such as rewards data system(s) 102, rewards benefit information that describes the rewards benefits for the financial account card for which the wireless device received card data. For example, when a wireless device receives card data for John Smith's financial account card with account number 1111 2222 3333 4444 issued to Big Bank, the wireless device may send a communication to a computer system associated with Big Bank including "John Smith" and "1111 2222 3333 4444" requesting if there are any rewards benefits associated with the financial account card. In response to the request, the wireless device may receive rewards benefit information matching the request. The rewards benefit information may include the type of purchases eligible for reward acquisition or reward redemption. In some embodiments, the wireless device may request the rewards benefit information from the user of the wireless device. For example, once the wireless device receives the card data, it may request the user of the wireless device if there are any rewards programs associated with the financial account for which it just received card data. The user may input the requested rewards benefit information to the extent it exists using an input/output device associated with the wireless device such as a touch screen or keypad. Once the wireless device receives the card data and the rewards benefit information for the one or more financial cards, it can store the card data consistent with present embodiments (Step 330).

In some embodiments, when the user of the wireless device uses it for a transaction, the wireless device may determine merchant information for the transaction (Step 340). The merchant information may include, for example, the identification of the merchant, the type of merchant, and/or the type of products or services being purchased in the transaction. In some embodiments, the wireless device may receive the merchant information from the POS processing the transaction or other merchant computing device such as merchant system(s) 104. For example, the POS may be configured to communicate with a wireless device using RFID, WiFi, Bluetooth, LiFi, or any other wireless communication protocol known in the art. In some embodiments, the merchant information includes a MCC that classifies the type of merchant participating in the transaction. The wireless device may include a lookup table that maps MCCs to merchant types. For example, the wireless device may include a lookup table that links the MCC "5411" with "Grocery Stores, Supermarkets" and when the wireless device receives a 5411 as a MCC for a particular transaction, the wireless device can use the lookup table to determine that the transaction is taking place at a grocery store or supermarket.

In some embodiments, the wireless device uses location services to determine the merchant information. For example, the wireless device may communicate with a computer system such as merchant location system(s) 103 that is capable of mapping geolocation data (e.g., GPS data) to merchants or MCCs. When the wireless device starts a transaction using stored card data, it may send a request to one or more remote computer systems including the wireless device's current location. In response to the request, the wireless device may receive a MCC for the closest merchant corresponding to the location of the wireless device. The wireless device may use a lookup table mapping the received MCC to a merchant type. In some embodiments, the wireless device may receive in response to the request the merchant type and/or the MCC directly from the computer system capable of mapping geolocation data to merchants or MCCs and in such embodiments, may not use a lookup table.

According to some embodiments, the merchant information may correspond to specific goods or services that the user of the wireless device is purchasing in a transaction. For example, the merchant information can contain multiple MCCs that correspond to the goods or services being purchased, and the multiple MCCs need not correspond with the MCC associated with the merchant (although the embodiments disclosed herein also contemplate MCCs corresponding to goods or services being the same as the MCC of the merchant from which those goods or services are purchased). For example, suppose the user of the wireless device is purchasing cosmetics and a news magazine at a pharmacy. The pharmacy might be associated with the MCC for drug stores and pharmacies (5912). Cosmetics are typically purchased from merchants associated with the MCC cosmetic stores (5977) and news magazines are typically purchased from merchants associated with the MCC for news dealers and newsstands (5994). In this example, the merchant information can include multiple MCCs: one for the pharmacy, one of cosmetics, and one for news magazines. In some embodiments, the merchant information can include product identifiers, such as SKUs for example, that the wireless device may use to determine the category of goods or services purchased in a transaction. According to some embodiments, wireless device may use the product identifiers to determine the classification of the goods being purchased. By providing transaction data regarding with the individual goods or services of a transaction for a transaction, process 300 can provide the opportunity for the wireless device to suggest multiple financial account cards for a transaction so that the user of the wireless device can maximize either reward acquisition or reward redemption.

Figure 6:
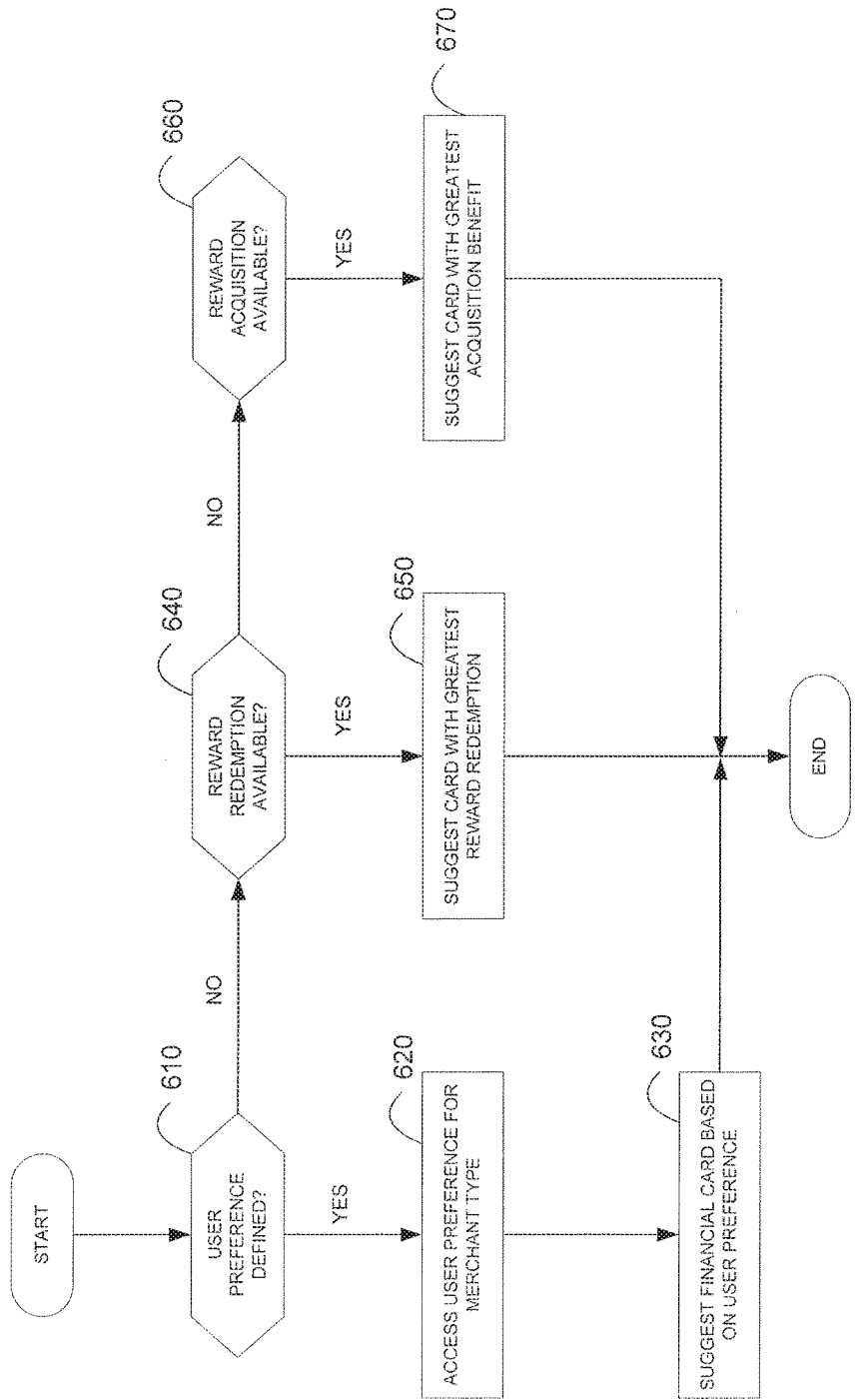
FIG. 6 is an exemplary flow diagram of a process for providing a suggestion of card data to use in a transaction based on user preferences or reward information.

After the wireless device determines the merchant information, it can provide a suggestion for a financial account card for the transaction. (Step 350). FIG. 6 shows an exemplary flow diagram of a process 600 for suggesting a card for use in a transaction consistent with present embodiments. The wireless device performing process 600 determines if a user preference has been defined for the transaction, (Step 610). According to some embodiments, the wireless device may store a user preference to use a financial account card for a merchant type. For example, the wireless device may store a preference to use a first financial account card for use when purchasing fuel and a second financial account card for use when purchasing office supplies. The wireless device may store the user preference responsive to receiving it from a user via the wireless device's input/output devices. For example, a user may store a financial account card that provides rewards associated with purchasing meals at restaurants. After the wireless device receives the card data associated with the financial account card, the wireless device may display one or more prompts asking the user if the user would like to associate the card data with a particular transaction type or merchant type. The user may provide input indicating that the wireless device should associate the card data with restaurant purchases. In response to receiving the user's input, the wireless device may store the preference for reference for later transactions.

According to some embodiments, if there is a user preference defined for the merchant type associated with transaction (Step 610: YES), the wireless device may access the stored user preference (Step 620) and suggest one or more financial account cards based on the user preference (Step 630). In some embodiments, the wireless device automatically selects the one or more suggested financial account cards for the transaction.

In some embodiments, the wireless device can make the suggestion by displaying a user interface listing all of the financial account cards stored on the device, with the suggested financial account card information highlighted by default, for example, as shown in FIG. 7. FIG. 7 shows an exemplary display 700 of wireless device 105, which may include a menu 710 of financial cards for which wireless device 105 has stored card data. As shown in FIG. 7, menu 710 may include a list of three cards designated as card 1, card 2, and card 3. Further, card 1 is shown as having been selected by selection box 720. Selection box 720 may be, for example, a highlighted border surrounding a selected item shown on display 700. A user may make a selection from menu 710 by using input keys (not shown) of wireless device 105, or by touching display 700. Furthermore, as shown in the exemplary embodiment of FIG. 7, card 1 may also be represented by image 730, which shows a graphical image of a card. Alternatively, card 1 may be selected for use in making a purchase by selecting image 730 using input keys or by touching display 700. Image 730 may be an image of a credit card, a logo, text, or any graphical image that the user has associated with card 1.

For example, a user may access menu 710 on wireless device 105. As shown in FIG. 7, menu 710 displays one or more cards that have card data stored in wireless device 105. The user may select a card, such as card 1, by using input keys, for example, from menu 710. Alternatively, the user may select card 1 by selecting image 730. Thereafter, the user may use wireless device 105 to make a purchase with card 1. A user may therefore make selections from menu 710 to select a particular card for a transaction.

Returning to FIG. 6, if there is no user preference defined for the merchant type associated with the transaction (Step 610: NO), the wireless device may make a suggestion based on rewards information. In some embodiments, the wireless device may suggest one or more financial card accounts for a transaction based on whether a reward redemption is available for the transaction (Step 640). For example, some rewards programs allow participants to exchange rewards points for discounts, free merchandise, or immediate cash back on purchases. The wireless device may communicate with one or more remote computing systems, such as rewards data system(s) 102, to determine if reward redemption is available for a transaction. For example, the wireless device may determine based on the merchant information that the transaction involves a fuel purchase. The wireless device may then check stored card data to determine if any of the stored cards offer reward redemption for fuel purchase, such as a discount per gallon, and whether the account associated with card data has rewards points balance that can be used to redeem for the reward (in this case, the per gallon discount). If a reward redemption is available (Step 640: YES), the wireless device suggests the financial account card with the greatest available redemption (Step 650). In some instances, a wireless device may have stored two or more sets of card data associated with financial account cards that offer a reward redemption, in which case, the wireless device will suggest the best financial account card for use in the transaction. For example, the wireless device may have stored two sets of card data offering a reward redemption for a fuel transaction. The first set of card data may offer a $0.03 discount per gallon of gas, while the second set of card data may offer a free gallon of gas. The wireless device may then suggest the financial account card associated with the second set of card data for use in a fueling transaction.

If there are no financial account cards offering rewards redemptions for the transaction (Step 640: NO), the wireless device may determine if rewards acquisition is available for the transaction (Step 660). For example, the wireless device may determine based on the merchant information that the transaction involves an electronics purchase. The wireless device may then checked stored card data to determine if any of the stored cards offer a rewards acquisition opportunity, such as earning rewards points, for the purchase of electronics. If rewards acquisition is available for the transaction (Step 660: YES), the wireless device suggests the financial account card with the greatest available acquisition benefit (Step 670). In some instances, a wireless device may have stored two or more sets of card data associated with multiple financial cards that offer a reward benefit for the transaction, in which case, the wireless device will suggest the best financial account card for use in the transaction. For example, if the wireless device stores two sets of card data offering reward acquisition for an electronics purchase. The first set of card data may be associated with a rewards program that offers double points for electronics purchases plus a 500 point bonus for electronics purchases, and the second set of card data may be associated with a rewards program that offers one and a half times normal points for electronics purchases. As such, the wireless device may suggest the financial account card associated with the first card data.

In some embodiments, the wireless device executing process 600 may communicate with one or more remote computing systems to obtain recent rewards information, such as rewards data system(s) 102. For example, rewards redemptions may depend on a financial card account holder's point balance, or rewards acquisition may only be offered for a limited time, or when an account holder's rewards balance reaches a particular value.

According to some embodiments, the wireless device may use information about the transaction when performing process 600. For example, the wireless device may use the purchase amount or quantity of item purchased to determine which financial account card to use in the transaction. For example, a user may define a preference to use a financial account card if the purchase amount is over $1000. The wireless device may also use the purchase amount to determine which card to suggest based on reward redemption or reward benefit. For example, a rewards program associated with a first financial account card may offer a reward redemption of $0.10 per gallon discount on gas for 1000 points, while a second rewards program may offer $2 off a fuel purchase for 1000 points. In this example, the amount of fuel purchased will determine which reward benefit offers the greater benefit to the user of the wireless device. If the fuel purchase amount is over 20 gallons, the wireless device may suggest the first financial account card and if the fuel purchase amount is less than 20 gallons, it may suggest the second financial account card. In some embodiments, the wireless device may use information about the transaction to suggest multiple financial account cards for a particular transaction based on reward redemption or reward acquisition information.

While FIG. 6 depicts process 600 occurring in one order, in other embodiment, the wireless device could perform process 600 in a different order. For example, in some embodiments, wireless device could perform Step 640 before Step 610, or Step 660 before Steps 610 or 640.

While processes 300 and 600 were described in terms of processing performed by a wireless device, one or more steps of processes 300 and 600 may be performed by other computing systems or devices in some embodiments. For example, in some embodiments, the wireless device may send card data for financial cards and its current location to a remote computer system, and the wireless device may receive in response a suggested financial account card for the transaction. Those will skill in the art will appreciate that such variations in processes 300 and 600 do not alter the spirit and scope of the disclosed embodiments.

Once the wireless device suggests a financial account card for the transaction, the user of the wireless device may select the financial account card for use in the transaction and may authenticate the transaction consistent with the embodiments disclosed herein. In some embodiments, security features, such as authorization, may be used to determine whether a transaction may proceed with a selected card. For example, in some embodiments, a security code may be required before a selected card may be used to make a transaction. When a user selects the card for making a purchase, a prompt may require the user to enter a security code to authorize use of the card data. Once entered, wireless device 105 may determine whether the correct security code has been entered by comparing the entered code with a code stored in memory 240 of wireless device 105. For example, the security code may be stored in an encrypted form in wireless device 105. After validating the security code, wireless device authorizes the use of the card data and wireless device 105 transmits the card data from wireless device 105 to the POS terminal. For example, card data may be transmitted from wireless device 105 to a nearby RFID reader. The RFID reader may be included in and/or connected to a POS terminal, as shown in FIG. 4. Further, the security code may be entered by the user via input keys on wireless device 105. Alternatively, the security code may be entered by the user at the POS terminal and transmitted over a network to an external server for validation. The security code may be a personal identification number (PIN). In other embodiments, instead of a security code, authorization may be provided by a fingerprint, voice print, or retinal scan of the user. Also, in any of the above embodiments, the security code may be received by wireless device 105 or by a POS terminal.

The foregoing descriptions have been presented for purposes of illustration and description. They are not exhaustive and do not limit the present embodiments to the precise form disclosed. Modifications and variations are possible in light of the above teachings or may be acquired from practicing of embodiments. For example, the described implementation includes software but other embodiments may be implemented as a combination of hardware and software or in hardware alone.

Additionally, although aspects of the present embodiments are described as being stored in memory, one skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

Other embodiments will be apparent to those skilled in the art from consideration of the specification and practice of the embodiments disclosed herein. The specification and examples should be considered as exemplary only.

What is claimed is:

1. A wireless device configured to facilitate payment at a merchant system, the wireless device comprising:
   one or more processors;
   one or more memories having instructions that, when executed by the one or more processors, cause the one or more processors to perform operations comprising:
      determining a location of the wireless device;
      determining a category of an item to be purchased in a transaction at the merchant system by:
         sending a request to one or more remote computer systems to obtain a category for a closest merchant corresponding to the location of the wireless device; and
         determining the category of the item based at least in part on the category for the closest merchant;
      determining, based at least in part on card data stored on the wireless device for a plurality of financial account cards, rewards benefit information for at least one of the financial account cards;
      determining a first financial account card to be utilized to purchase the item, the first financial account card being determined based at least in part on the determined rewards benefit information and the determined category of the item; and
      communicating to the merchant system card data of the first financial account card; and
   a display screen configured to display data on a graphical user interface, the data comprising:
      information for the financial account cards; and
      an identification of the first financial account card.

2. The wireless device of claim 1, wherein determining rewards benefit information comprises:
   sending a request to one or more remote computer systems to obtain the rewards benefit information; and
   receiving the rewards benefit information.

3. The wireless device of claim 1, wherein the instructions further cause the one or more processors to perform the operations of:
receiving a user preference related to the first financial account card and wherein the determination of the first financial account card is based at least in part on the user preference.

4. The wireless device of claim 3, wherein the user preference includes a preference to use the first financial account card based on reward acquisition information associated with the plurality of financial account cards.

5. The wireless device of claim 3, wherein the user preference includes a preference to use the first financial account card based on reward redemption information associated with the plurality of financial account cards.

6. The wireless device of claim 3, wherein the user preference includes a preference to use one the first financial account card based on the merchant type.

7. The wireless device of claim 1, wherein the instructions further cause the one or more processors to perform the operations of:
determining a second financial account card to be utilized to purchase a second item to be purchased in the same transaction at the merchant system.

8. The wireless device of claim 7, wherein the instructions further cause the one or more processors to perform the operations of:
determining a category of the second item based at least in part on the location of the wireless device; and
determining the second financial account card to be utilized to purchase the second item based at least in part on the determined rewards benefit information and the determined category of the second item.

9. A method for enabling a wireless device associated with a user to identify card data for use during a transaction at a merchant system, the method comprising:
determining, by one or more processors, a location of the wireless device;
determining, by the one or more processors, a category of an item to be purchased in the transaction by:
sending a request to one or more remote computer systems to obtain a category for a closest merchant corresponding to the location of the wireless device; and
determining the category of the item based at least in part on the category for the closest merchant;
determining, by the one or more processors, based at least in part on card data stored on the wireless device for a plurality of financial account cards, rewards benefit information for at least one of the financial account cards;
determining, by the one or more processors, a first financial account card to be utilized to purchase the item, the first financial account card being determined based at least in part on the determined rewards benefit information and the determined category of the item; and
communicating, to the merchant system via the wireless device, card data of the first financial account card; and
displaying, via a display screen configured to display data on a graphical user interface, information for the financial account cards and an identification of the first financial account card.

10. The method of claim 9, further comprising:
sending a request to one or more remote computer systems to obtain the rewards benefit information; and
receiving the rewards benefit information.

11. The method of claim 9, further comprising:
receiving a user preference related to the first financial account card and wherein the determination of the first financial account card is based at least in part on the user preference.

12. The method of claim 11, wherein the user preference includes a preference to use the first financial account card based on reward acquisition information associated with the plurality of financial account cards.

13. The method of claim 11, wherein the user preference includes a preference to use the first financial account card based on reward redemption information associated with the plurality of financial account cards.

14. The method of claim 11, wherein the user preference includes a preference to use the first financial account financial account card based on the merchant type.

15. The method of claim 9, further comprising:
determining a second financial account card to be utilized to purchase a second item to be purchased in the same transaction at the merchant system.

16. A non-transitory computer readable medium storing instructions that, when executed by one or more processors, causes the one or more processors to perform operations comprising:
determining a location of the wireless device;
determining a category of an item to be purchased in a transaction at the merchant system by:
sending a request to one or more remote computer systems to obtain a category for a closest merchant corresponding to the location of the wireless device; and
determining the category of the item based at least in part on the category for the closest merchant;
determining, based at least in part on card data stored on the wireless device for a plurality of financial account cards, rewards benefit information for at least one of the financial account cards;
determining a first financial account card to be utilized to purchase the item, the first financial account card being determined based at least in part on the determined rewards benefit information and the determined category of the item; and
communicating to the merchant system card data of the first financial account card; and
displaying, via a display screen configured to display data on a graphical user interface, information for the financial account cards and an identification of the first financial account card.

17. The non-transitory computer readable medium of claim 16, wherein the operations further comprise:
sending a request to one or more remote computer systems to obtain the rewards benefit information; and
receiving the rewards benefit information.

* * * * *